March 23, 1926.
G. MATZ
1,578,200
WHEEL STRUCTURE
Filed July 23, 1925
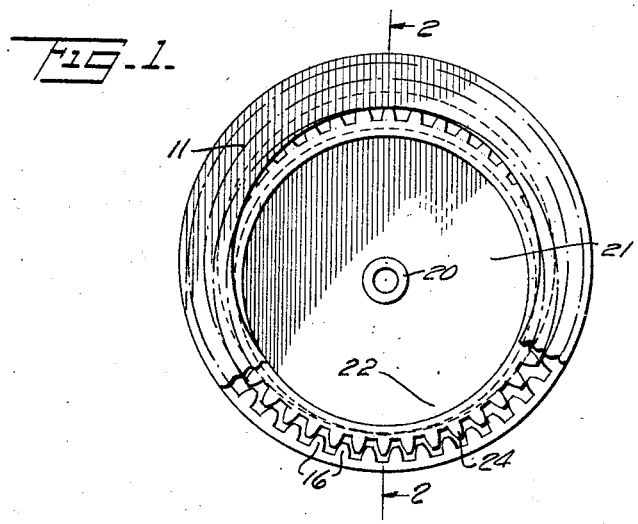
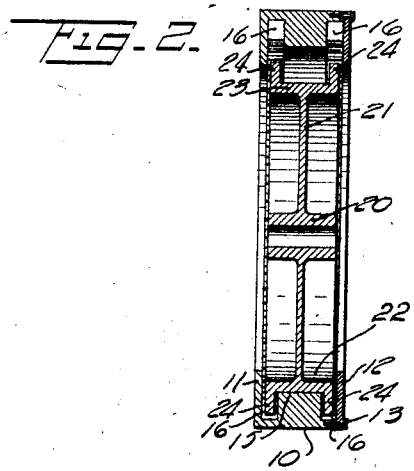
INVENTOR
George Matz
BY
Marshall & Hawley,
ATTORNEYS Patented Mar. 23, 1926.

1,578,200

UNITED STATES PATENT OFFICE.

GEORGE MATZ, OF NEW YORK, N. Y.

WHEEL STRUCTURE.

Application filed July 23, 1925. Serial No. 45,479.

*To all whom it may concern:*

Be it known that I, GEORGE MATZ, a citizen of Russia, and a resident of New York, county of Bronx, and State of New York, United States of America, have invented certain new and useful Improvements in Wheel Structures, of which the following is a specification.

This invention relates to wheel structure.

As is well known, the ordinary vehicle wheel rolls on the ground or road surface. With such structures only one of the contacting elements has any motion, namely, the wheel, and it will be evident that where a wheel is used to drive the vehicle there must be considerable friction between the wheel and road surface on which it rolls in order to insure the necessary traction.

This invention has for its salient object to provide a wheel structure so constructed and arranged that the structure will include a track for the wheel which will roll with the wheel and, furthermore, provide parts so associated that the necessary traction can be obtained under all conditions of use.

Another object of the invention is to provide a wheel construction having traction means and wheel supporting means separate from the traction means so that the weight of the vehicle will not be borne by the traction providing means.

Further objects of the invention will appear from the following specification taken in connection with the drawings, which form a part of this application, and in which Fig. 1 is an elevational view, partly broken away of a wheel structure constructed in accordance with the invention; and Fig. 2 is a transverse sectional elevation taken substantially on line 2—2 of Fig. 1.

The invention briefly described consists of a rim within which a wheel is mounted and a wheel adapted to roll on the rim. The wheel and rim are provided with coacting surfaces by means of which the weight of the wheel and the parts carried by the wheel is supported within the rim and these parts are further provided with means for insuring traction between the wheel and the rim.

The diameter of the rim is greater than the diameter of the wheel and thus as the structure rotates, the wheel can rotate on its supporting structure in the rim and the desired traction will be furnished by coacting means formed on the rim and wheel.

Further details of the invention will appear from the following description.

In the particular embodiment of the invention illustrated, the rim is provided with a body portion 10, a flange 11 formed on or secured to one edge of the body portion and a removable flange 12 secured in any suitable manner as by bolts 13 to the other edge of the body portion. The flanges are greater in radial width than the difference between the diameters of the wheel and rim and thus the wheel will be always retained within the rim during the operation thereof.

The body portion 10 of the rim is provided with an inwardly extending annular wheel supporting portion 15 which is adapted to support the weight of the wheel and the parts carried thereby. The rim is provided at its lateral edges at the sides of the portion 15 with inwardly extending teeth 16.

The wheel may be of any desired form and in the particular embodiment illustrated, the wheel comprises a central hub 20 having an outwardly extending disk 21 on the outer periphery of which there is mounted a wheel rim 22. This rim has a central portion 23 adapted to coact with and engage the portion 15 of the outer rim and there are provided at each lateral edge of the rim 22 outwardly extending teeth 24 adapted to coact with the teeth 16 of the outer rim.

When the wheel structure above described is in use, the wheel and parts carried thereby will be supported on the portion 15 of the outer rim and the engagement of teeth 24 formed on the wheel rim with teeth 16 formed on the outer rim will furnish the necessary traction. By reason of the coacting surfaces on the portion 15 and of the outer rim and wheel rim, the load will not be carried by the traction teeth and, therefore, will not tend to wear or injure the teeth. Inequalities in the road surface do not affect the proper meshing of the gear teeth and the hub is always at the same distance from the road surface. Thus, the life of the wheel will be increased. Furthermore, it will be noted that the teeth 24 are disposed on opposite sides of the inwardly extending portion 15 and this tends to retain the wheel in position on the rim supplementing the flanges 11 and 12.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A wheel structure comprising an outer rim having a continuous outer surface, a wheel mounted within said outer rim and adapted to roll therein, annular coacting surfaces on said rim and wheel at the peripheries thereof for supporting the wheel and means distinct from said surfaces for insuring traction between said wheel and outer rim.

2. A wheel structure comprising an outer rim, a wheel having a rim disposed within said outer rim and adapted to roll therein, the diameter of the outer rim being greater than the diameter of the wheel rim, annular surfaces formed on the wheel rim and outer rim at the peripheries thereof adapted to coact and support the wheel on said outer rim, traction means extending inwardly from the outer rim and outwardly from the wheel rim and means on said outer rim enclosing said coacting surfaces and said traction means.

3. A wheel structure comprising an outer rim, a wheel having a rim disposed within said outer rim and adapted to roll therein, the diameter of the outer rim being greater than the diameter of the wheel rim, annular surfaces formed on the wheel rim and outer rim at the peripheries thereof adapted to coact and support the wheel on said outer rim and traction means extending inwardly from the outer rim and outwardly from the wheel rim, said traction means overlapping said annular surfaces.

4. A wheel structure comprising an outer rim having an inwardly extending centrally disposed annular portion, a wheel having a rim adapted to be supported on the annular portion of the outer rim, and coacting traction means on the wheel rim and outer rim disposed at the side edges of said central annular portion of the outer rim.

In witness whereof, I have hereunto set my hand this 18th day of July, 1925.

GEORGE MATZ.